L. S. McCORMICK.
AUTOMOBILE STEERING POST LOCK.
APPLICATION FILED DEC. 27, 1919.
1,353,408.
Patented Sept. 21, 1920.
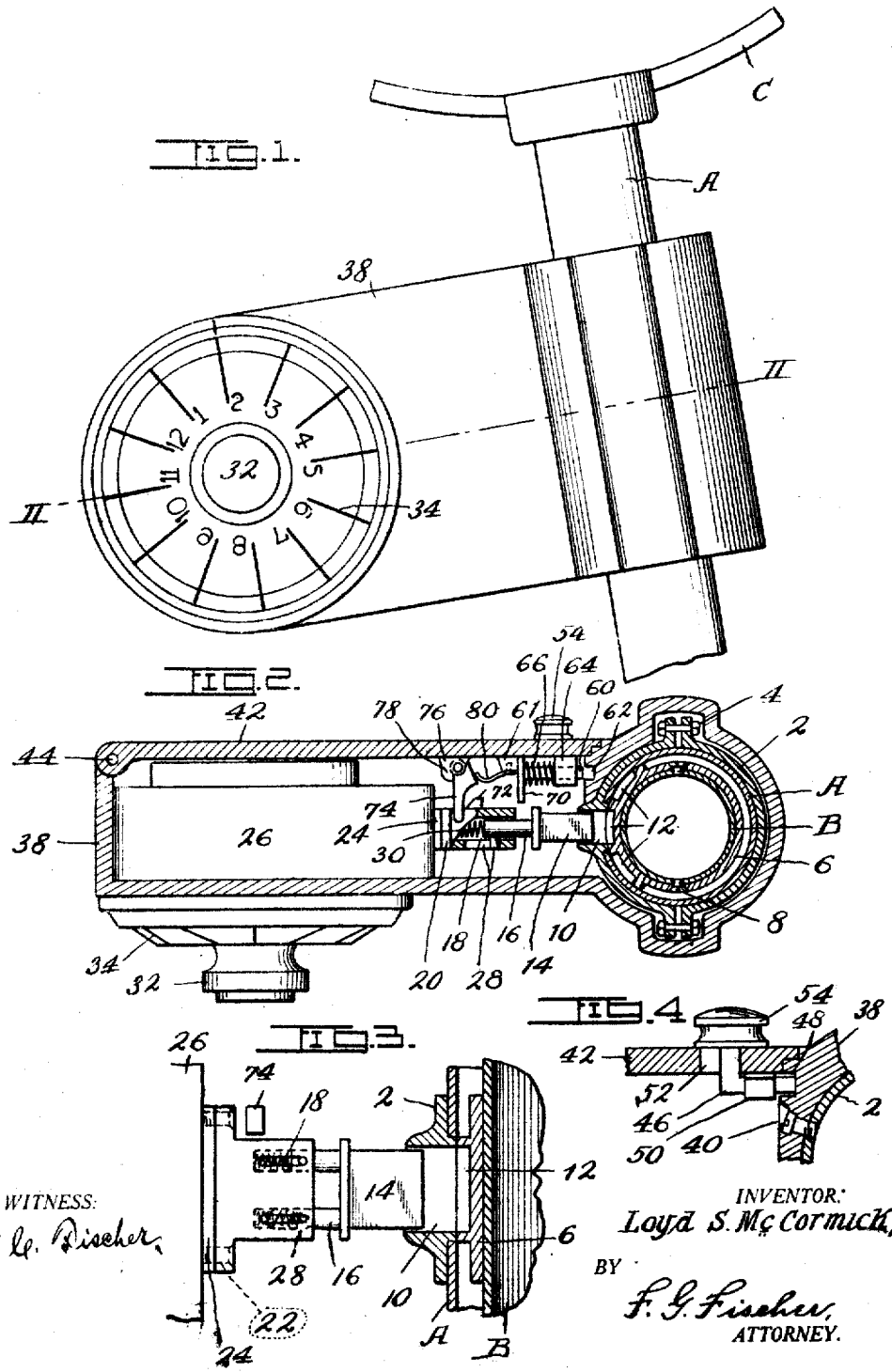
WITNESS:
Fred G. Fischer
INVENTOR:
Loyd S. McCormick,
BY
F. G. Fischer,
ATTORNEY.

UNITED STATES PATENT OFFICE.

LOYD S. McCORMICK, OF LEAVENWORTH, KANSAS.

AUTOMOBILE-STEERING-POST LOCK.

1,253,408.

Specification of Letters Patent.   Patented Sept. 21, 1920.

Application filed December 27, 1919.   Serial No. 347,729.

*To all whom it may concern:*

Be it known that I, LOYD S. McCORMICK, a citizen of the United States, residing at Leavenworth, in the county of Leavenworth, and State of Kansas, have invented certain new and useful Improvements in Automobile-Steering-Post Locks, of which the following is a specification.

My invention relates to means for locking the steering gear of automobiles, so that the same cannot be towed or driven away by unauthorized persons. The invention embraces a combination lock, flexible bolt mechanism controlled by said combination lock and adapted to secure the steering post against rotation so that the automobile can not be guided, and a protective case mounted upon the steering column and inclosing said bolt mechanism and all of the combination lock excepting its knob and dial.

In order that the invention may be fully understood, reference will now be had to the accompanying drawing, in which:

Figure 1 is a fragmentary side elevation of a steering column equipped with the invention.

Fig. 2 is an irregular longitudinal section taken on line II—II of Fig. 1.

Fig. 3 is a fragmentary side elevation partly in section of the flexible bolt mechanism.

Fig. 4 is a fragmentary sectional view of means for securing the door of the case in closed position.

Referring now in detail to the various parts, A designates the steering column and B the steering post which is rotatably mounted within said column A and connected by the usual linkage to the front wheels of the automobile for guiding the same.

The steering column A is reinforced by a ring 2, preferably, made in two parts and firmly clamped in position by suitable means, such as bolts 4. The steering post B is likewise reinforced with a ring 6 secured to said post by suitable means, such as screws 8. The ring 2 is provided with a guide slot 10, with which any one of the keepers 12 formed in the ring 6, are adapted to register to receive a supplemental bolt 14, whereby said steering post B may be reliably secured from rotation.

The bolt 14 is provided with a pair of cylindrical extensions 16 loosely mounted in counterbores 18 in a member 20 firmly secured by suitable means, such as screws 22 to the forward end of the main bolt 24 of the combination lock 26. The cylindrical extensions 16 of the supplemental bolt 14 have pin-and-slot connections 28 with the member 20 and are normally held in an advanced position by light coil springs 30, arranged in the counterbores 18.

The combination lock 26 is of usual construction and controlled in the usual manner by a knob 32 having a dial 34 inscribed thereon.

The reinforcing rings 2 and 6 and the body of the combination lock 26 are inclosed in a case 38 to protect said rings and lock from being tampered with. The case 38 has openings in its top and bottom walls, so that after the steering wheel C has been removed said case 38 may be slipped directly over the steering column A and the reinforcing rings 2 and 6, and be firmly secured to said ring 2 by suitable means such as screws 40, which are accessible only from the inside of the case 38.

The case 38 is provided with a relatively large door 42 connected at one end to said case 38 by a hinge 44 and provided at its opposite end with a manually-controlled bolt 46 adapted to enter a recess 48 in the case 38. The bolt 46 is mounted in a guide 50 and extends outwardly through a slot 52 in the door 42, and is provided with a knob 54, whereby it may be operated.

An automatic bolt 60 is also employed to lock the door 42 in closed position when the steering post B is locked, so that access cannot be had to the lock mechanism within the case 38. The automatic bolt 60 is adapted to enter a recess 62 in the case 38 and is slidably mounted in a guide 64, which like the guide 50, is fixed to the inner side of the door 42. A coil spring 66 is interposed between the guide 64 and a flange 70 on the rear end of the bolt 60, to unlock the same when the supplemental bolt 14 is withdrawn from the keeper 12. When the main bolt 24 and the supplemental bolt 20, are advanced to lock with the member 20, are advanced to lock with the steering post B, a lug 72 on said member 20 engages the flange 70 and pushes the bolt 60 into the recess 62. From the foregoing it will be understood that the door 42 of the case 38 is automatically locked by the bolt 60 at the time the steering post B is locked and that said door 42 is automatically unlocked through the action of the spring 66, so that access may be gained to the interior of the case 38 for repairs and adjustments when the steering post B is unlocked.

When the automobile is running along the main bolt 24 is prevented by a yieldable detent 74 from being moved forwardly by vibration and locking the steering post B. Said detent 74 is pivotally mounted on a lug 76 formed on the inner side of the door 42 and provided with a shoulder 78 against which said detent 74 is yieldably held by a spring 80, secured to the lug 61. When the main bolt 24 is thrown forwardly by manually rotating the knob 32 of the combination lock, the pressure of the spring 80 is overcome and the detent 74 is swung out of the way by the member 20.

By employing a combination lock as above-described, there are no keys to become lost or misplaced and the combination for actuating said lock can be changed whenever desired, and by employing a flexible connection between the supplemental bolt 14 and the main bolt 24, the latter cannot be damaged when pressure is exerted on the former by an unauthorized person in attempting to turn the steering wheel C to guide the automobile. Furthermore, said flexible connection enables the main bolt 24 to move forward through a greater distance than the supplemental bolt 14 and compress the springs 30, so that the same will hold said bolt 14 in the registering keeper 12.

From the foregoing description it will be readily understood that I have provided an efficient locking mechanism whereby the steering posts of an automobile can be reliably locked against rotation, thus insuring an automobile equipped with such lock against theft, and while I have shown and described the preferred form of my invention, I reserve the right to make such changes in the construction, combination and arrangement of parts as properly fall within the spirit and scope of the claims.

Having thus described my invention, what I claim and desire to secure by Letters Patent, is:

1. In combination with the steering post and the steering column of an automobile, mechanism for locking said steering post from rotation, a case surrounding the steering column and inclosing the main portion of the lock mechanism, a door to said case to permit access thereto, a bolt to lock said door in closed position, spring means to throw said bolt to inactive position, so that the door may be opened, and means controlled by the lock mechanism for moving said bolt to active position at the time the steering post is locked.

2. In combination with the steering post and the steering column of an automobile, a supplemental bolt for locking the steering post from rotation, a combination lock having a main bolt, a yieldable connection between said main bolt and the supplemental bolt whereby the latter is actuated by the former, a case surrounding the steering column and inclosing the supplemental bolt and the major portion of the combination lock, and mechanism carried by said case to prevent the main bolt from being moved outwardly by vibration and thus effecting the locking of the steering post.

3. In combination with the steering post and the steering column of an automobile, a ring fixed to said steering post and provided with a plurality of keepers, a two-piece ring clamped to the steering column and provided with a guide slot with which the keepers are adapted to register, a lock having a case inclosing the two rings and secured to the two-piece ring, a supplemental bolt in the case adapted to be guided by said guide slot into engagement with a registering keeper, a main bolt in the case to actuate said supplemental bolt, a door to the lock case, a secondary bolt actuated by the main bolt to lock the door when the main bolt is advanced, and a spring to retract said secondary bolt when the main bolt is restored to inactive position.

In testimony whereof I affix my signature, in the presence of two witnesses.

LOYD S. McCORMICK.

Witnesses:
F. G. FISHER,
L. J. FISHER.